(12) United States Patent
Andersson et al.

(10) Patent No.: US 8,795,407 B2
(45) Date of Patent: Aug. 5, 2014

(54) MACHINABILITY IMPROVING COMPOSITION

(75) Inventors: Olof Andersson, Helsingborg (SE); Bo Hu, Greensburg, PA (US)

(73) Assignee: Hoganas AB (Publ), Hoganas (SE)

( * ) Notice: Subject to any disclaimer, the term of this patent is extended or adjusted under 35 U.S.C. 154(b) by 53 days.

(21) Appl. No.: 13/132,967

(22) PCT Filed: Dec. 21, 2009

(86) PCT No.: PCT/SE2009/000532
§ 371 (c)(1),
(2), (4) Date: Jun. 24, 2011

(87) PCT Pub. No.: WO2010/074627
PCT Pub. Date: Jul. 1, 2010

(65) Prior Publication Data
US 2011/0262294 A1    Oct. 27, 2011

Related U.S. Application Data

(60) Provisional application No. 61/193,841, filed on Dec. 30, 2008.

(30) Foreign Application Priority Data

Dec. 22, 2008 (SE) ....................... 0802656

(51) Int. Cl.
B22F 1/00    (2006.01)
B22F 3/12    (2006.01)
B22F 3/24    (2006.01)

(52) U.S. Cl.
USPC ............... 75/252; 75/231; 419/10; 419/19; 419/38

(58) Field of Classification Search
CPC ........ B22F 1/0003; B22F 1/0059; B22F 3/02; B22F 3/10; B22F 2998/10
USPC .......... 75/252, 231, 234; 419/19, 38
See application file for complete search history.

(56) References Cited

U.S. PATENT DOCUMENTS

| | | | |
|---|---|---|---|
| 2,389,061 A * | 11/1945 | Kuzmick ................... 428/560 |
| 3,829,295 A | 8/1974 | Farmer et al. |
| 4,274,875 A | 6/1981 | Cadle et al. |
| 4,927,461 A | 5/1990 | Ciloglu et al. |
| 5,326,526 A | 7/1994 | Ikenoue et al. |
| 5,631,431 A | 5/1997 | Andersson |
| 5,938,814 A | 8/1999 | Uenosono et al. |
| 6,139,598 A | 10/2000 | Narasimhan et al. |
| 6,214,080 B1 | 4/2001 | Narasimhan et al. |
| 6,409,964 B1 * | 6/2002 | Aota et al. ................... 419/19 |
| 6,599,345 B2 * | 7/2003 | Wang et al. .................. 75/231 |
| 7,135,053 B2 * | 11/2006 | Ishihara et al. .............. 75/252 |
| 7,300,490 B2 | 11/2007 | Ozaki et al. |
| 2003/0077448 A1 * | 4/2003 | Ueta et al. .................. 428/403 |
| 2007/0199409 A1 | 8/2007 | Andersson |
| 2009/0041608 A1 | 2/2009 | Ozaki et al. |

FOREIGN PATENT DOCUMENTS

| | | |
|---|---|---|
| EP | 0 183 666 A1 | 6/1986 |
| EP | 0 334 212 A2 | 9/1989 |
| EP | 1 002 883 A1 | 5/2000 |
| EP | 1 985 393 A1 | 10/2008 |
| GB | 2 248 850 A | 4/1992 |
| GB | 2 318 126 A | 4/1998 |
| JP | 60-145353 A | 7/1985 |
| JP | 1-255604 A | 10/1989 |
| JP | 10-317002 A | 12/1998 |
| WO | WO 2005/102567 A1 | 11/2005 |

OTHER PUBLICATIONS

International Search Report (PCT/ISA/210) for PCT/SE2009/000532 dated Apr. 22, 2010.
Written Opinion (PCT/ISA/237) for PCT/SE2009/000532 dated Apr. 22, 2010.

* cited by examiner

*Primary Examiner* — George Wyszomierski
*Assistant Examiner* — Ngoclan T Mai
(74) *Attorney, Agent, or Firm* — Buchanan Ingersoll & Rooney P.C.

(57) ABSTRACT

An iron-based powder composition is provided comprising, in addition to an iron-based powder, a minor amount of a machinability improving additive comprising at least one silicate from the group of phyllosilicates. The technology further concerns the use of the machinability improving additive and a method for producing an iron-based sintered part having improved machinability.

19 Claims, 1 Drawing Sheet

US 8,795,407 B2

MACHINABILITY IMPROVING COMPOSITION

TECHNICAL FIELD OF THE INVENTION

The invention refers to a powder metal composition for production of powder metal parts, as well as a method for producing powder metal parts, having improved machinability.

BACKGROUND OF THE INVENTION

One of the major advantages of powder-metallurgical manufacture of components is that it becomes possible, by compacting and sintering, to produce blanks of final or very close to final shape. There are however instances where subsequent machining is required. For example, this may be necessary because of high tolerance demands or because the final component has such a shape that it cannot be pressed directly but requires machining after sintering. More specifically, geometries such as holes transverse to the compacting direction, undercuts and threads, call for subsequent machining.

By continuously developing new sintered steels of higher strength and thus also higher hardness, machining has become one of the major problems in powder-metallurgical manufacture of components. It is often a limiting factor when assessing whether powder-metallurgical manufacture is the most cost-effective method for manufacturing a component.

Today, there are a number of known substances which are added to iron-based powder mixtures to facilitate the machining of components after sintering. The most common powder additive is MnS, which is mentioned e.g. in EP 0 183 666, describing how the machinability of a sintered steel is improved by the admixture of such powder.

U.S. Pat. No. 4,927,461 describes the addition of 0.01 and 0.5% by weight of hexagonal BN (boron nitride) to iron-based powder mixtures to improve machinability after sintering.

U.S. Pat. No. 5,631,431 relates to an additive for improving the machinability of iron-based powder compositions. According to this patent the additive contains calcium fluoride particles which are included in an amount of 0.1-0.6% by weight of the powder composition.

The Japanese patent application 08-095649 describes a machinability enhancing agent. The agent comprises $Al_2O_3$—$SiO_2$—$CaO$ and has an anorthite or a gehlenite crystal structure. Anortithe is a tectosilicate, belonging to the feldspar group, having Mohs hardness of 6 to 6.5 and gehlenite is a sorosilicate having Mohs hardness of 5-6.

U.S. Pat. No. 7,300,490 describes a powder mixture for producing pressed and sintered parts consisting of a combination of manganese sulfide powder (MnS) and calcium phosphate powder or hydroxy apatite powder.

WO publication 2005/102567 discloses a combination of hexagonal boron nitride and calcium fluoride powders used as machining enhancing agent.

Boron containing powders such as boron oxide, boric acid or ammonium borate, in combination with sulphur is described in U.S. Pat. No. 5,938,814.

Other combinations of powder to be used as machining additives are described in EP 1985393A1, the combination containing at least one selected from talc and steatite and a fatty acid.

Talc as machining enhancing agent is mentioned in JP1-255604. Talc belongs to the group of phyllosilcates, consisting silicon tetrahedral layers, enclosing a magnesium hydroxide octahedral layer.

The application EP1002883 describes a powdered metal blend mixture for making metal parts, especially valve seat inserts. The blends described contain 0.5-5% of solid lubricants in order to provide low friction and sliding wear as well as improvement in machinability. In one of the embodiments, mica is mentioned as a solid lubricant. These types of powder mixtures, used for production of wear resistant and high temperature stable components, always contain high amounts of alloying elements, typically above 10% by weight and hard phases, typically carbides.

U.S. Pat. No. 4,274,875 teaches a process for the production of articles, similar to what is described in EP1002883, by powder metallurgy including the step of adding powdered mica to the metal powder before compaction and sintering in amounts between 0.5 to 2 weight %. Specifically, it is disclosed that any type of mica can be used.

Further, the Japanese patent application JP10317002, describes a powder or a sintered compact having a reduced friction coefficient. The powder has a chemical composition of 1-10 weight % of sulphur, 3-25 weight of molybdenum and the balance iron. Further a solid lubricant and hard phase materials are added.

Machining of pressed and sintered components is very complex and is influenced by parameters such as type of alloying system of the component, sintered density of the component and size and shape of the component. It is also obvious that type of machining operation and speed of machining are parameters which have a great importance of the outcome of the machining operation. The diversity of proposed machining enhancing agents to be added to powder metallurgical compositions reflects the complex nature of the PM machining technology.

SUMMARY OF THE INVENTION

The present invention discloses a new additive for improving the machinability of sintered steels. Especially for low alloyed sintered steels having a content of alloying elements below 10% by weight and being free from hard phase materials. The new additive is designed for improving the machinability of such sintered steels subjected to chip removing operations such as drilling, turning, milling and threading. Further the new additive can be used in components to be machined by several types of tool materials such as high speed steel, tungsten carbides, cermets, ceramics and cubic boron nitride and the tool may also be coated.

An object of the present invention is thus to provide a new additive for a powder metal composition for improvement of machinability.

Another object of the present invention is to provide such additive to be used at various machining operations of different types of sintered steels.

Another object of the present invention is to provide a new machinability enhancing substance having no or negligible impact on the mechanical properties of the pressed and sintered component.

A further object of the invention is to provide a powder metallurgical composition containing the new machinability enhancing additive, as well as a method of preparing a compacted part from this composition.

It has now been found that by including a machinability enhancing agent comprising a defined special type of silicate in a powder composition, a surprisingly great improvement of the machinability of sintered components having various microstructures and sintered densities is achieved. Furthermore, the positive effect on machinability is obtained even at very low added amounts, thus the negative impact on the compressibility by adding additional substances will be minimized. It has also been shown that the influence on the mechanical properties from the added silicate is acceptable.

The invention thus provides an iron-based powder composition comprising, in addition to an iron-based powder, a minor amount of a machinability improving additive, said additive comprising at least one silicate from the group of phyllosilicates. The invention also provides the use of a phyllosilicate as a machinability improving agent in an iron-based powder composition. The invention further provides a method for producing an iron-based sintered part having improved machinability comprising the steps of: preparing an iron-based powder composition as above, compacting the iron-based powder composition at a compaction pressure of 400-1200 MPa, sintering the compacted part at a temperature of 1000-1300° C. and optionally heat treating the sintered part.

According to the present invention, at least one of the above objects, as well as other objects evident from the below discussion, is achieved by the different aspects of the present invention.

According to one aspect of the present invention, there is provided an iron-based powder composition comprising, in addition to an iron-based powder, a minor amount of a machinability improving additive in powder form, said additive comprising at least one silicate from the group consisting of phyllosilicates.

The phyllosilicate may be chosen e.g. among clay minerals, such as bentonite, kaolinite and smectite, among chlorites, or among micas such as phlogopite, muscovite, biotite and margarite.

According to another aspect of the present invention, there is provided a use of a phyllosilicate comprised in a machinability improving additive in an iron-based powder composition.

According to another aspect of the present invention, there is provided a method of preparing an iron-based powder composition, comprising: providing an iron-based powder; and admixing the iron-based powder with a machinability improving additive in powder form, the machinability improving additive comprising at least one phyllosilicate.

According to another aspect of the present invention, there is provided a method for producing an iron-based sintered part having improved machinability, comprising: preparing an iron-based powder composition according to the above aspect; compacting the iron-based powder composition at a compaction pressure of 400-1200 MPa; sintering the compacted part at a temperature of 1000-1300° C.; and optionally heat treating the sintered part.

DETAILED DESCRIPTION OF THE INVENTION

Figure 1:
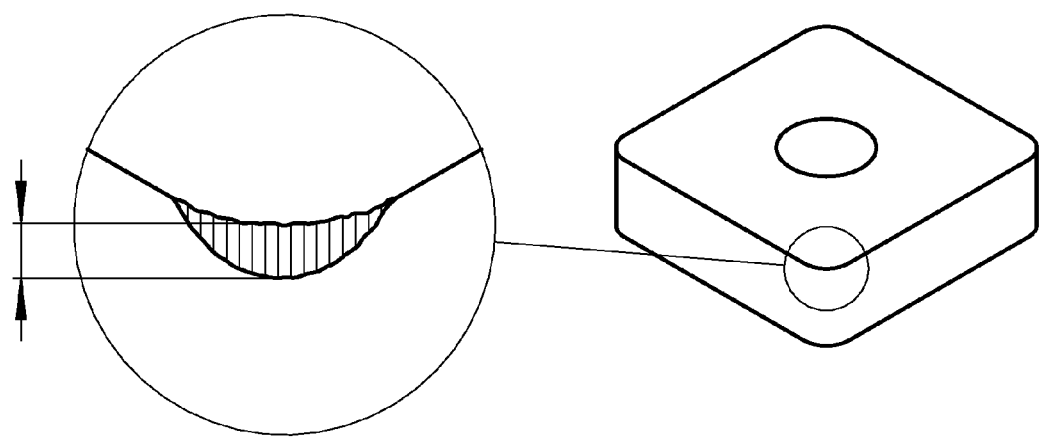
FIG. 1 displays a schematic drawing of how the wear of the insert cutting edge is measured, i.e. the distance between the two arrows in the figure, for the machinability index for examples 1, 3, 4, 5, 7, and 8.

The machinability enhancing agent comprises a defined silicate, classified as phyllosilicates, which may be characterised by having a Mohs hardness below 5, preferable below 4. The phyllosilicate has a flake crystal structure containing layers of silicon tetrahedrals combined with layers of octahedral structures of hydroxides. Preferably some of the silicon atoms in the tetrahedrals may be replaced by other atoms such as aluminum atoms, the silicate thus being denoted aluminate-silicate. Alternatively, the aluminum atoms are present in the octahedral structures, or the aluminum atoms will be present in both structures.

Examples of silicates that may be included in the new machinability enhancing additive are:
micas such as:
phlogopite $KMg_3(OH,F)_2[AlSi_3O_{10}]$,
muscovite $KAl_2(OH)_2[AlSi_3O_{10}]$,
biotite $K(Mg,Fe)_3(OH)_2[AlSi_3O_{10}]$, and
margarite $CaAl_2(OH)_2[Al_2Si_2O_{10}]$;
silicates belonging to the chlorite group;
clay minerals such as:
kaolinite $Al_2(OH)_4[Si_2O_5]$;
clay minerals belonging to the smectite group such as:
aliettite $Ca_{0.2}Mg_6(Si,Al)_8O_{20}(OH)_4*4H2O$,
beidellite $(Na,Ca_{0.5})_{0.3}Al_2(Si,Al)_4O_{10}(OH)_2*nH_2O$,
hectorite $Na_{0.3}(Mg,Li)_3Si_4O_{10}(OH,F)_2$,
montmorillonite $(Na,Ca)_{0.33}(Al,Mg)_2Si_4O_{10}(OH)_2*nH_2O$,
nontronite $Na_{0.3}Fe_2(Si,Al)_4O_{10}(OH)_2*nH_2O$,
saponite $Ca_{0.25}(Mg,Fe)_3(Si,Al)_4O_{10}(OH)_2*nH_2O$,
stevensite $(Ca,Na)_xMg_3Si_4O_{10}(OH)_2$,
volkonskoite $Ca_{0.3}(Cr,Mg,Fe)_2(Si,Al)_4O_{10}(OH)_2*4H_2O$, and
yakhontovite $(Ca,Na)_{0.5}(Cu,Mg,Fe)_2Si_4O_{10}(OH)_2*3H_2O$.

Normally, silicate minerals occur in nature as a combination of defined minerals, commercially it exists therefore different combinations of chemically defined silicates or intermediates thereof, such as various types of bentonites, containing montmorillonite. The present invention is not restricted to silicates defined by a single specific structure but also includes combinations and intermediates of the silicates described above.

The reason why the silicates used according to the present invention may have hardness below 5, preferably below 4, according to Mohs scale, and may have a layered structure, is that it has now been found that such silicates will contribute to machining properties even at relative low temperatures during machining of the sintered body, compared to harder silicates. Negative impact on the tool, caused by during machining evolved heat, can thus be avoided. Silicates having a higher hardness may not contribute to the lubrication during compaction and ejection of the compacted body from the dye. Low hardness in combination with a layered crystal structure of the silicates added is then favourable and enhances the lubricating properties, thus allowing lower added amount of conventional lubricants, enabling higher green densities to be reached.

Furthermore, without being bound to any specific theory it is believed that the presence of aluminum atoms in the silicate may have a positive effect on the machining properties and contributes to the good machinability properties regardless of the metallograhic structures of the components to be machined.

The new additive may include or be mixed with other known machining enhancing additives such as manganese sulfide, hexagonal boron nitride, other boron containing substances and/or calcium fluoride.

The amount of additive in the iron-based powder composition may be between 0.05% and 1.0 by weight, preferably between 0.05% and 0.5%, preferably between 0.05% and 0.4%, preferably between 0.05% and 0.3% and more preferably between 0.1 and 0.3% by weight. Lower amounts may not give the intended effect on machinability and higher amounts may have a negative influence on mechanical properties. Thus, the amount of machinability improving agent added to the iron-based powder composition may be less than 0.5 wt %, conveniently 0.49 wt % or less, preferably 0.45 wt % or less, more preferably 0.4 wt % or less, such as 0.3 wt % or less, or 0.2 wt % or less, or 0.15 wt % or less.

The particle size, $X_{99}$, of the new additive according to the invention may be below 50 µm, preferably below 30 µm, more preferably below 20 µm, such as 15 µm or less. The corresponding mean particle size, $X_{50}$, may be below 20 µm, preferably below 15 µm, more preferably 10 µm or less, such as 5 µm or less. The particle size, $X_{99}$, may essentially be at least 1 µm. If the particle size is below 1 µm it may be difficult to obtain a homogeneous powder mixture. A particle size above 50 µm may negatively influence the machinability and mechanical properties.

The machinability improving effect of the machinability improving additive of the present invention may be especially pronounced when the component to be machined has a martensitic structure, or a heterogeneous structure comprising a martensitic structure.

Iron Based Powder Composition
Powder Types

This new machinability improvement powder can be used in essentially any ferrous powder compositions. Thus the iron-based powder may be a pure iron powder such as atomized iron powder, reduced powder, and the like. Also prealloyed powders including alloying elements such as Ni, Mo, Cr, V, Co, Mn, Cu, may be used as well as partially alloyed steel powder. Of course, these powders may be used in a mixture.

The machinability improving additive is present in the composition in powder form. The additive powder particles may e.g. be mixed with the iron-based powder as free powder particles or be bound to the iron-based powder particles e.g. by means of a binding agent.

Other Additives

The powder composition according to the invention may also include other additives such as graphite, binders and lubricants and other conventional machinability improving agents. Lubricant may be added at 0.05-2% by weight, preferably 0.1-1% by weight. Graphite may be added at 0.05-2% by weight, preferably 0.1-1% by weight.

Process

The powder-metallurgical manufacture of components according to the invention may be performed in a conventional manner, i.e. by the following process: iron-based powder, e.g. the iron or steel powder, may be admixed with any desired alloying elements, such as nickel, copper, molybdenum and optionally carbon as well as the machinability improving additive according to the invention in powder form. The alloying elements may also be added as preailloyed or diffusion alloyed to the iron based powder or as a combination between admixed alloying elements, diffusion alloyed powder or preailloyed powder. This powder mixture may be admixed with a conventional lubricant, for instance zinc stearate or amide wax, prior to compacting. Finer particles in the mix may be bonded to the iron based powder by means of a binding substance. The powder mixture may thereafter be compacted in a press tool yielding what is known as a green body of close to final geometry. Compacting generally takes place at a pressure of 400-1200 MPa. After compacting, the compact may be sintered at a temperature of 1000-1300° C. and is given its final strength, hardness, elongation etc. Optionally, the sintered part may be further heat-treated.

EXAMPLES

The present invention will be illustrated in the following non-limiting examples:

Machinability Enhancing Agents

The following substances were used as examples of machinability enhancing agents according to the invention:

A muscovite containing powder, having a particle size, $X_{99}$, essentially below 20 µm and a chemical composition expressed as weight % oxides according to below;

| | |
|---|---|
| $SiO_2$ | 48.0 |
| $Al_2O_3$ | 33.3 |
| $K_2O$ | 10.1 |
| FeO | 2.8 |
| MgO | 0.3 |
| Loss on ignition | 5.5 |

A phlogopite containing powder, having a men particle size, $X_{50}$, about 18 µm and the particle size, $X_{99}$, essentially below 45 µm and a chemical composition expressed as weight % oxides according to below;

| | |
|---|---|
| $SiO_2$ | 39.5 |
| $Al_2O_3$ | 10.3 |
| $K_2O$ | 12.8 |
| FeO | 10.3 |
| MgO | 22.7 |
| CaO | 0.5 |
| Loss on ignition | 3.0 |

A powder containing minerals belonging to the smectite group, having a particle size, $X_{99}$, essentially below 20 µm and a chemical composition expressed as weight % oxides according to below;

| | |
|---|---|
| $SiO_2$ | 68.2 |
| $Al_2O_3$ | 10.9 |
| $K_2O$ | 0.3 |
| FeO | 1.3 |
| MgO | 17.0 |
| CaO | 1.1 |
| $Na_2O$ | 1.2 |

Loss on ignition (Loss on ignition not measured, chemical analysis calculated when l.o.i excluded)

A calcium bentonite containing powder having a particle size, $X_{99}$, essentially below 15 µm and a chemical composition expressed as weight % oxides according to below;

| | |
|---|---|
| $SiO_2$ | 55.1 |
| $Al_2O_3$ | 23.3 |
| $K_2O$ | 2.9 |
| FeO | 1.6 |
| MgO | 2.9 |
| CaO | 4.7 |
| $Na_2O$ | 1.9 |
| Loss on ignition | 9.5 |

Example 1

Machinability Investigation, Carried Out with a Turning Operation, on As-Sintered PM Material The bentonite powder was mixed with a metal powder, a water atomized iron powder AHC100.29 available from Höganäs AB, Sweden. The metal powder was also mixed with 2 wt % copper powder, 0.8% of ethylene bisstearamide as lubricant, and graphite, 0.8 wt %.

The metal powder mixes according to table 1 were compacted to standardised TRS bars according to ISO 3325 and rings with an outer diameter of 55 mm, an inner diameter of 35 mm and a height of 20 mm, to a green density of 6.9 g/cm$^3$.

The TRS bars and rings were sintered in a laboratory mesh belt furnace at 1120° C. for 20 minutes in a mix of 10% hydrogen and 90% nitrogen. The obtained micro structure of the samples was pearlitic. The sintered TRS bars were used to determine transversal rupture strength according to ISO 3325 and the sintered rings were used in turning tests to determine a machinability index as can be seen in Table 2.

The machinability index is defined as the flank wear on a turning tool, i.e. the removed material from an insert cutting edge. FIG. 1 discloses how this wear is measured. Turning was performed on the outer diameter of the rings with a tungsten carbide insert, with constant spindle speed and constant feed without coolant.

Table 1 shows that the mechanical properties of the compacted rings are almost unaffected by the added bentonite. However, for rings with added bentonite a remarkable improvement in machinability is a fact, which is shown in Table 2. The machinability index for rings comprising bentonite was reduced by almost 50% (i.e. the wear of the insert cutting edge was reduced) compared to rings without this additive, for the same cutting distance.

TABLE 1

| MIX | BENTONITE [%] | DC [%] | HRB | TRS [MPa] |
|---|---|---|---|---|
| 1 | — | 0.21 | 77-80 | 945 |
| 2 | 0.2 | 0.18 | 77-78 | 952 |

DC is the dimensional change in length for the transversal rupture strength bar during sintering
HRB is the Rockwell B hardness for the transversal rupture strength bar
TRS is the transversal rupture strength for the transversal rupture strength bar

TABLE 2

| MIX | BENTONITE [%] | SPINDLE SPEED [rpm] | CUTTING DISTANCE [m] | M. INDEX [μm] |
|---|---|---|---|---|
| 1 | — | 1800 | 168 | 850 |
| 2 | 0.2 | 1800 | 168 | 450 |
| 2 | 0.2 | 1800 | 333 | 850 |

Spindle speed is the rotation per minutes in the turning lathe.
Cutting distance is the length made by the insert in engagement in sintered ring.
M. index (Machinability index) is the flank wear in μm on the insert cutting edge after covered cutting distance (see FIG. 1).

Example 2

Machinability Investigation, Carried Out with Drilling Operation, on As-Sintered PM Material The muscovite and the phlogopite powder were mixed with a metal powder Distaloy AE, available from Höganäs AB, Sweden, which is pure iron diffusion alloyed with 0.5% of Mo, 4% of Ni and 1.5% of Cu. The metal powder was also mixed with a lubricant, 0.8 wt % EBS (etylenbisstearamide) and 0.5 wt % graphite.

The material mixes in Table 3 were compacted to standardised tensile test bars according to ISO 2740 and to discs with a diameter of 80 mm and a height of 12 mm, to a green density of 7.10 g/cm$^3$. The tensile bars and discs were sintered in a laboratory mesh belt furnace at 1120° C. for 30 minutes in a mix of 10% hydrogen and 90% nitrogen. The obtained micro structure of the samples was heterogeneous, containing ferrite, nickel rich austenite, pearlite, bainite and martensite.

The discs were used in drill tests to determine a machinability index as can be seen in Table 4. This index is defined as the number of holes per drill that can be machined before the drill is totally worn out, i.e. a total drill break down. Drilling was performed with high speed steels drill, diameter 03.5, with constant speed and constant feed without any coolant.

Table 3 shows that when the mica powders muscovite and phlogopite are added only minor deviations in mechanical properties are found. Machinability is remarkable improved with Phlogopite and even more extraordinarily improved with muscovite (i.e. considerably more holes could be drilled) as shown in Table 4.

TABLE 3

| MIX | MUSCOVITE [%] | PHLOGOPITE [%] | DC [%] | HV10 | YS [MPa] | TS [MPa] | A [%] |
|---|---|---|---|---|---|---|---|
| 1 | — | — | −0.15 | 211 | 373 | 737 | 2.5 |
| 2 | 0.3 | — | −0.13 | 203 | 362 | 693 | 2.2 |
| 3 | — | 0.3 | −0.09 | 205 | 371 | 718 | 2.4 |

DC is the dimensional change in length for the tensile strength bar during sintering
HV10 is the Vickers hardness for the tensile strength bar
YS is the yield strength for the tensile strength bar
TS is the tensile strength for the tensile strength bar
A is the plastic elongation during tensile strength test

TABLE 4

| MIX | MUSCOVITE [%] | PHLOGOPITE [%] | SPINDLE SPEED [rpm] | M. [DRILLED HOLES] |
|---|---|---|---|---|
| 1 | — | — | 3820 | 78 |
| 2 | 0.3 | — | 3820 | 415 |
| 3 | — | 0.3 | 3820 | 136 |

Spindle speed is the rotation per minutes in the drilling machine
M. index (Machinability index) is the average number of drilled holes before total drill break down of the drill.

Example 3

Machinability Investigation, Carried Out with a Turning Operation, on Sintered, Quenched and Tempered PM Material The bentonite powder was mixed in with a metal powder, a water atomized iron powder AHC100.29 available from Höganäs AB, Sweden. The metal powder was also mixed with 2 wt % copper powder, a lubricant, 0.8 wt % EBS (etylenbisstearamide), and graphite, 0.8 wt %.

The material mixes according to table 5 were compacted to rings with an outer diameter of 55 mm, an inner diameter of 35 mm and a height of 20 mm, to a green density of 6.9 g/cm$^3$. The rings were sintered in a laboratory mesh belt furnace at 1120° C. for 20 minutes in a mix of 10% hydrogen and 90% nitrogen. After sintering the rings were heat treated at 980° C. for 30 minutes then quenched in oil. Directly after oil quenching the rings was tempered at 200° C. in one hour in air. The obtained micro structure was fully martensitic.

The rings were used in turning tests to determine a machinability index as can be seen in Table 6. The machinability index is defined as the flank wear on a turning tool, i.e. the removed material from an insert cutting edge. FIG. 1 discloses how this wear is measured. Turning was performed on the outer diameter of the ring with silicon nitride ceramic inserts, with constant spindle speed and constant feed without coolant.

Table 5 shows that the hardness of heat treated rings is unaffected by the added bentonite. However, the machinability is remarkably improved when bentonite is used as shown in Table 6. The machinability index for rings comprising bentonite was reduced by more than 50% (i.e. the wear of the insert cutting edge was reduced) compared to rings without this additive, for the same cutting distance.

TABLE 5

| MIX | BENTONITE [%] | HRC |
|---|---|---|
| 1 | — | 32-34 |
| 2 | 0.2 | 32-34 |

HRC is the Rockwell C hardness for the heat treated ring

TABLE 6

| MIX | BENTONITE [%] | SPINDLE SPEED [rpm] | CUTTING DISTANCE [m] | M. INDEX [μm] |
|---|---|---|---|---|
| 1 | — | 1800 | 168 | 160 |
| 2 | 0.2 | 1800 | 168 | 90 |
| 2 | 0.2 | 1800 | 809 | 160 |

Spindle speed is the rotation per minutes in turning lathe
Cutting distance is the length made by the insert in engagement in sintered ring.
M. index (Machinability index) is the flank wear on the insert cutting edge after covered cutting distance.

Example 4

Machinability Investigation, Carried Out with a Turning Operation, on Sinter Hardened PM Material The bentonite powder was mixed in with a metal powder, a water atomized steel powder Astaloy A, available from Höganäs AB, Sweden, which is pre-alloyed with 1.9% Ni and 0.55% Mo. The metal powder was also mixed with 2 wt % copper powder, a lubricant, 0.8 wt % EBS (etylenbissteara-mide), and graphite, 0.8 wt %.

The material mixes according to table 7 were compacted to rings with an outer diameter of 55 mm, an inner diameter of 35 mm and a height of 20 mm, to a green density of 6.9 g/cm³. The rings were sinter hardened in a production furnace at 1120° C. for 20 minutes in a mix of 10% hydrogen and 90% nitrogen with 2.2° C./s cooling rate. After sinter hardening the rings were tempered at 200° C. for 30 minutes in air. The obtained micro structure was fully martensitic.

The rings were used in turning tests to determine a machinability index as can be seen in Table 8. The machinability index is defined as the face wear on a turning tool, i.e. the removed material from an insert cutting edge. FIG. 1 discloses how this wear is measured. Turning was performed on the outer diameter of the ring with silicon nitride ceramic inserts, with constant spindle speed and constant feed without coolant.

Table 7 shows that hardness of heat treated rings is slightly harder by the added amount of the bentonite. The machinability is remarkable improved when bentonite is used as shown in Table 8. The machinability index for rings comprising bentonite was reduced by about 60% (i.e. the wear of the insert cutting edge was reduced) compared to rings without this additive, for the same cutting distance.

TABLE 7

| MIX | BENTONITE [%] | HRC |
|---|---|---|
| 1 | — | 33-34 |
| 2 | 0.2 | 35-38 |

HRC is the Rockwell C hardness for the heat treated ring

TABLE 8

| MIX | BENTONITE [%] | SPINDLE SPEED [rpm] | CUTTING DISTANCE [m] | M. INDEX [μm] |
|---|---|---|---|---|
| 1 | — | 1800 | 168 | 296 |
| 2 | 0.2 | 1800 | 168 | 100 |
| 2 | 0.2 | 1800 | 809 | 143 |

Spindle speed is the rotation per minutes in the turning lathe
Cutting distance is the length made by the insert in engagement in sintered ring.
M. index (Machinability index) is the flank wear on the insert cutting edge after covered cutting distance.

Example 5

Machinability Investigation, Carried Out with a Turning Operation, on Sinter Hardened PM Material The bentonite powder was mixed in with a metal powder, a water atomized steel powder Astaloy CrL, available from Höganäs AB, Sweden, a prealloyed powder having 1.5% Cr and 0.2% Mo. The metal powder was also mixed with 2 wt % copper powder, a lubricant, 0.8 wt % EBS (etylenbissteara-mide), and graphite, 0.75 wt %.

The mixes according to table 9 were compacted to rings with an outer diameter of 55 mm, an inner diameter of 35 mm and a height of 20 mm, to a green density of 6.9 g/cm³. The rings were sinter hardened in a production furnace at 1120° C. for 20 minutes in a mix of 10% hydrogen and 90% nitrogen with 2.2° C./s cooling rate. After sinter hardening the rings were tempered at 200° C. for 30 minutes in air. The obtained micro structure was fully martensitic.

The rings were used in turning tests to determine a machinability index as can be seen in Table 10. The machinability index is defined as the face wear on a turning tool, i.e. the removed material from an insert cutting edge. FIG. 1 discloses how this wear is measured. Turning was performed on the outer diameter of the rings with silicon nitride ceramic inserts, with constant spindle speed and constant feed without coolant.

Table 9 shows that hardness of heat treated rings is slightly harder by the added amount of the bentonite. Machinability is remarkable improved when Bentonite is used as shown in Table 10. The machinability index for rings comprising bentonite was reduced by about 75% (i.e. the wear of the insert cutting edge was reduced) compared to rings without this additive, for the same cutting distance.

TABLE 9

| MIX | BENTONITE [%] | HRC |
|---|---|---|
| 1 | — | 33-35 |
| 2 | 0.2 | 33-36 |

HRC is the Rockwell C hardness for the heat treated ring

TABLE 10

| MIX | BENTONITE [%] | SPINDLE SPEED [rpm] | CUTTING DISTANCE [m] | M. INDEX [μm] |
|---|---|---|---|---|
| 1 | — | 1800 | 168 | 210 |
| 2 | 0.2 | 1800 | 168 | 56 |
| 2 | 0.2 | 1800 | 809 | 79 |

Spindle speed is the rotation per minutes in the turning lathe
Cutting distance is the length made by the insert in engagement in sintered ring.
M. index (Machinability index) is the flank wear on the insert cutting edge after covered cutting distance.

Example 6

Machinability Investigation, Carried Out with Drilling Operation, on Sinter Hardened PM Material The muscovite, the phlogopite and the smectite powder were mixed with a metal powder, a water atomized steel powder Astaloy CrM, available from Höganäs AB, Sweden, which is iron pre alloyed with 3% Cr and 0.5 Mo. The metal powder was also mixed with a lubricant, 0.8 wt % EBS (etylenbisstearamide) and 0.55 wt % graphite.

The material mixes in Table 11 were compacted to standardised tensile test bars according to ISO 2740 and to discs with a diameter of 80 mm and a height of 12 mm, to a green density of 7.10 g/cm$^3$. The tensile bars and discs were sinter hardened in a laboratory mesh belt furnace at 1120° C. for 30 minutes in a mix of 10% hydrogen and 90% nitrogen with 2.2° C./s cooling rate. After sinter hardening the TS bars and discs were tempered at 200° C. for 30 minutes in air. The obtained micro structure was fully martensitic.

The discs were used in drill tests to determine a machinability index as can be seen in Table 12. This index is defined as a critical cutting speed. If a drill could produce the total amount of holes (216) on one disc at a certain cutting speed without total drill break down, a new drill together with an increased cutting speed should be carried out at the following test. Drilling was performed with solid carbide drill, diameter Ø3.5, with constant feed without any coolant.

Table 11 shows that when the muscovite, the phlogopite or smectite powders are added some minor deviations in mechanical properties are found. Machinability is remarkable improved with the muscovite, the phlogopite or the smectite allowing increased spindle speed without drill failure as shown in Table 12.

TABLE 11

| MIX | MUSCO-VITE [%] | PHLOG-OPITE [%] | SMEC-TITE [%] | HV10 | MHV0.05 (MAR-TENSITE) | TS [MPA] |
|---|---|---|---|---|---|---|
| 1 | — | — | — | 455 | 698 | 1055 |
| 2 | 0.3 | — | — | 389 | 637 | 908 |
| 3 | — | 0.3 | — | 378 | 714 | 837 |
| 4 | — | — | 0.3 | 432 | 715 | 992 |

HV10 is the Vickers hardness for the tensile strength bar
MHV0.05 is the Micro Vickers martensite hardness for the tensile strength bar
TS is the tensile strength for the tensile strength bar

TABLE 12

| MIX | MUSCO-VITE [%] | PHLOGO-PITE [%] | SMEC-TITE [%] | SPINDLE SPEED [rpm] | M. INDEX [DRILLED HOLES] |
|---|---|---|---|---|---|
| 1 | — | — | — | 3638 | 30 |
| 2 | 0.3 | — | — | 3638 | 216 |
| 2 | 0.3 | — | — | 4547 | 216 |
| 3 | — | 0.3 | — | 3638 | 216 |
| 3 | — | 0.3 | — | 4547 | 216 |
| 4 | — | — | 0.3 | 3638 | 216 |
| 4 | — | — | 0.3 | 4547 | 216 |

Spindle speed is the rotation per minutes in the drilling machine
The testing was interrupted after 216 drilled holes, no failure of the drills were noticed.

Example 7

Machinability Investigation, Carried Out with Turning Operation, on Sinter Hardened PM Material The muscovite, the phlogopite and the smectite powder were mixed with a metal powder, a water atomized steel powder Astaloy CrM as in example 6. The metal powder was also mixed with a lubricant, 0.8 wt % EBS (etylenbisstearamide) and 0.55 wt % graphite.

The mixes in table 13 were compacted to standardised tensile test bars according to ISO 2740 and to rings with an outer diameter of 64 mm, an inner diameter of 35 mm and a height of 25 mm, to a green density of 7.10 g/cm$^3$. The tensile bars and rings were sinter hardened in a laboratory mesh belt furnace at 1120° C. for 30 minutes in a mix of 10% hydrogen and 90 nitrogen with 2.2° C./s cooling rate. The obtained microstructure was fully martensitic.

After sinter hardening the TS bars and rings were tempered at 200° C. for 30 minutes in air. The rings were used in turning tests to determine a machinability index as can be seen in Table 14. The machinability index is defined as the flank wear on a turning tool, i.e. the removed material from an insert cutting edge. FIG. 1 discloses how this wear is measured. Turning was performed on the end face of the rings with cubic boron nitride inserts, at constant cutting speed and constant feed without coolant.

Table 13 shows that when the powders muscovite, phlogopite or smectite are added some minor deviations in mechanical properties are found.

Machinability is remarkable improved with muscovite, phlogopite or smectite are used as shown in Table 14. The machinability index for rings comprising the different additives were considerably reduced (i.e. the wear of the insert cutting edge was reduced) compared to rings without these additives, for the same cutting distance.

TABLE 13

| MIX | MUSCO-VITE [%] | PHLOG-OPITE [%] | SMEC-TITE [%] | HV10 | MHV0.05 (MAR-TENSITE) | TS [MPa] |
|---|---|---|---|---|---|---|
| 1 | — | — | — | 455 | 698 | 1055 |
| 2 | 0.3 | — | — | 389 | 637 | 908 |
| 3 | — | 0.3 | — | 378 | 714 | 837 |
| 4 | — | — | 0.3 | 432 | 715 | 992 |

HV10 is the Vickers hardness for the tensile strength bar
MHV0.05 is the Micro Vickers martensite hardness for the tensile strength bar
TS is the tensile strength for the tensile strength bar

TABLE 14

| MIX | MUSCO-VITE [%] | PHLOG-OPITE [%] | SMEC-TITE [%] | CUTTING SPEED [m/min] | CUTTING DISTANCE [m] | M. INDEX [μm] |
|---|---|---|---|---|---|---|
| 1 | — | — | — | 150 | 1015 | 200 |
| 2 | 0.3 | — | — | 150 | 1015 | 60 |
| 2 | 0.3 | — | — | 150 | 9132 | 100 |
| 3 | — | 0.3 | — | 150 | 1015 | 80 |
| 3 | — | 0.3 | — | 150 | 9132 | 110 |
| 4 | — | — | 0.3 | 150 | 1015 | 80 |
| 4 | — | — | 0.3 | 150 | 9132 | 80 |

Cutting speed is the ring speed from outer to inner ring diameter expressed in meter per minutes in turning machine
Cutting distance is the length made by the insert in engagement in sintered ring.
M. index (Machinability index) is the flank wear on the insert cutting edge after covered cutting distance.

Example 8

Machinability Investigation, Carried Out with a Turning Operation, on Sinter Hardened PM Material The bentonite powder was mixed in with a metal powder, a water atomized steel powder Astaloy CrM as in example 6. The metal powder was also mixed with a lubricant, 0.8 wt % EBS (etylenbisstearamide), and graphite, 0.6 wt %.

The mixes according to table 15 were compacted to rings with an outer diameter of 55 mm, an inner diameter of 35 mm and a height of 20 mm, to a green density of 6.9 g/cm$^3$. The rings were sinter hardened in a production furnace at 1120° C. for 20 minutes in a mix of 10% hydrogen and 90% nitrogen with 2.2° C./s cooling rate. After sinter hardening the rings were tempered at 200° C. for 30 minutes in air. The obtained micro structure was fully martensitic.

The rings were used in turning tests to determine a machinability index as can be seen in Table 16. The machinability index is defined as the flank wear on a turning tool, i.e. the removed material from an insert cutting edge. FIG. 1 discloses how this wear is measured. Turning was performed on the outer diameter of the ring with silicon nitride ceramic inserts, with constant spindle speed and constant feed without coolant.

Table 15 shows that the hardness of heat treated rings is slightly harder by the added amount of the bentonite. Machinability is remarkable improved when the bentonite is used as shown in Table 16. The machinability index for rings comprising bentonite was reduced by about 70% (i.e. the wear of the insert cutting edge was reduced) compared to rings without this additive, for the same cutting distance.

TABLE 15

| MIX | BENTONITE [%] | HRC |
|---|---|---|
| 1 | — | 33-35 |
| 2 | 0.2 | 33-36 |

HRC is the Rockwell C hardness for the heat treated ring

TABLE 16

| MIX | BENTONITE [%] | SPINDLE SPEED [rpm] | CUTTING DISTANCE [m] | M. INDEX [μm] |
|---|---|---|---|---|
| 1 | — | 1800 | 168 | 246 |
| 2 | 0.2 | 1800 | 168 | 77 |
| 2 | 0.2 | 1800 | 809 | 177 |

Spindle speed is the rotation per minutes in turning lathe
Cutting distance is the length made by the insert in engagement in sintered ring.
M. index (Machinability index) is the flank wear on the insert cutting edge after covered cutting distance.

Example 9

Machinability Investigation, Carried Out with Drilling Operation, on As-Sintered PM Material Muscovite and phlogopite powders having different particle size distribution, seen in Table 17, were measured with laser diffraction equipment (Sympatec GmbH) according to method Fraunhofer App. ISO13320-1:1999.

TABLE 17

| MATERIAL | ABBR. | X50 | X99 |
|---|---|---|---|
| MUSCOVITE | M1 | 31.7 | 128.4 |
| MUSCOVITE | M2 | 8.4 | 39.7 |
| MUSCOVITE | M3 | 3.4 | 12.3 |
| PHLOGOPITE | P1 | 7.4 | 34.6 |
| PHLOGOPITE | P2 | 4.6 | 13.6 |

The X50 value is the particle size [μm] where 50 weight % of the population have a particle size below the value.
The X99 value is the particle size [μm] where 99 weight % of the population have a particle size below the value.

Muscovite and phlogopite powder were mixed with a metal powder Distaloy AE, available from Höganäs AB, Sweden, which is pure iron diffusion alloyed with 0.5% of Mo, 4% of Ni and 1.5% of Cu. The metal powder was also mixed with a lubricant, 0.8 wt % EBS (etylenbisstearamide) and 0.5 wt % graphite.

The material mixes in Table 18 (expressed as percent by weight) were compacted to standardized tensile test bars according to ISO 2740 and to discs with a diameter of 80 mm and a height of 12 mm, to a green density of 7.10 g/cm$^3$. The tensile bars and discs were sintered in a laboratory mesh belt furnace at 1120° C. for 30 minutes in a mix of 10% hydrogen and 90 nitrogen. The obtained micro structure of the samples was heterogeneous, containing ferrite, nickel rich austenite, pearlite, bainite and martensite.

TABLE 18

| MIX | M1 [%] | M2 [%] | M3 [%] | P1 [%] | P2 [%] |
|---|---|---|---|---|---|
| 1 | — | — | — | — | — |
| 2 | 0.3 | — | — | — | — |
| 3 | — | 0.3 | — | — | — |
| 4 | — | — | 0.15 | — | — |
| 5 | — | — | 0.30 | — | — |
| 6 | — | — | — | 0.30 | — |
| 7 | — | — | — | — | 0.30 |

M1 = Muscovite powder with particle size distribution X50 = 31.7 μm and X99 = 128.4 μm
M2 = Muscovite powder with particle size distribution X50 = 8.4 μm and X99 = 39.7 μm
M3 = Muscovite powder with particle size distribution X50 = 3.4 μm and X99 = 12.3 μm
P1 = Phlogopite powder with particle size distribution X50 = 7.4 μm and X99 = 34.6 μm
P2 = Phlogopite powder with particle size distribution X50 = 4.6 μm and X99 = 13.6 μm The discs were used in drill tests to determine a machinability index as can be seen in Table 19. This index is defined as the number of holes per drill that can be machined before the drill is totally worn out, i.e. a total drill break down. Drilling was performed with high speed steels drill, diameter Ø3.5, with constant speed and constant feed without any coolant.

Machinability is improved with phlogopite and is even more improved with muscovite (i.e. considerably more holes could be drilled) as shown in Table 19, except for the coarser muscovite (M1).

TABLE 19

| MIX | ADDITIVE [TYPE] | ADDITIVE [WT %] | SPINDLE SPEED [rpm] | RRELATIVE MACHINABILITY INDEX |
|---|---|---|---|---|
| 1 | — | — | 3820 | 1 |
| 2 | M1 | 0.30 | 3820 | 1 |
| 3 | M2 | 0.30 | 3820 | 5.3 |
| 4 | M3 | 0.15 | 3820 | 5.9 |
| 5 | M3 | 0.30 | 3820 | 11.1 |
| 6 | P1 | 0.30 | 3820 | 1.9 |
| 7 | P2 | 0.30 | 3820 | 2.6 |

Spindle speed is the rotation per minutes in the drilling machine
Relative machinability index is the ratio of the average number of drilled holes before total drill break down for each mixture 1-7 and the average number of drilled holes for mixture 1 (i.e. the mixture without the machinability improving additive).

Figure 2:
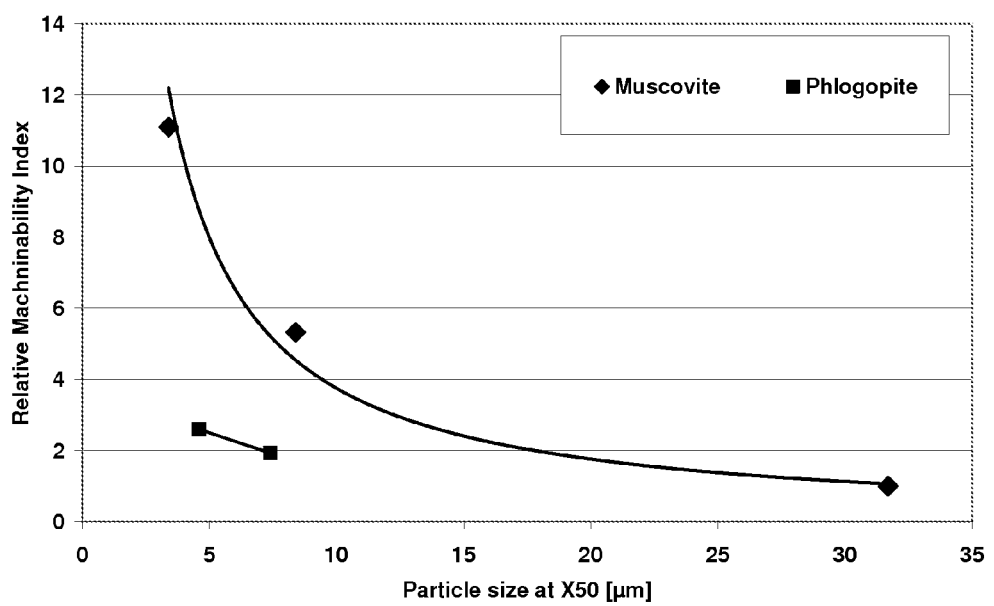
FIG. 2 is a schematic diagram illustrating the effect of average particle size of the machinability improving agents muscovite and phlogopite, respectively, on a relative machinability improving index.

By defining a relative machinability index as the ratio of the average number of drilled holes before total drill break down of the drill and the average number of drilled holes in material without additive before total drill break down of the drill, a correlation between machinability and the particle size distribution ($X_{50}$) of muscovite becomes evident, as can be seen in FIG. 2.

With decreasing particle size ($X_{50}$) the influence on machinability is significant with muscovite with high increasing machinability effect, while with phlogopite a less increasing effect can be found.

As is evident from FIG. 2, the mean particle size $X_{50}$, is conveniently 20 μm or less, preferably 15 μm or less, more preferably 10 μm or less, especially 5 μm or less.

The amount of added machinability agent, as shown for example for muscovite, has an influence on dimensional change, mechanical properties and hardness, as can be seen in Table 20.

TABLE 20

| MIX | MUSCOVITE [WT %] | DC [%] | HV10 | YS [MPa] | TS [MPa] | A [%] |
|---|---|---|---|---|---|---|
| 1 | — | −0.15 | 211 | 373 | 737 | 2.5 |
| 4 | 0.15 | −0.13 | 209 | 372 | 708 | 2.2 |
| 5 | 0.30 | −0.12 | 188 | 356 | 650 | 2.4 |

DC is the dimensional change in length for the tensile strength bar during sintering
HV10 is the Vickers hardness for the tensile strength bar
YS is the yield strength for the tensile strength bar
TS is the tensile strength for the tensile strength bar
A is the plastic elongation during tensile strength test

The invention claimed is:

1. An iron-based powder composition comprising, in addition to an iron-based powder, a minor amount of a machinability improving additive in powder form, said additive comprising a bentonite in powder form, wherein the content of the machinability improving additive is 0.05-1% by weight of the iron-based powder composition, wherein the iron-based powder comprises less than 10% by weight of alloying elements.

2. The iron-based powder composition according to claim 1, wherein the particle size, $X_{99}$, of the machinability improving additive is below 50 μm.

3. The iron-based powder composition according to claim 1, wherein the average particle size, $X_{50}$, of the machinability improving additive is below 20 μm.

4. The iron-based powder composition according to claim 1, wherein the content of the machinability improving additive is 0.05-0.3% by weight of the iron-based powder composition.

5. The iron-based powder composition according to claim 1, wherein the content of the machinability improving additive is 0.05-0.2% by weight of the iron-based powder composition.

6. The iron-based powder composition according to claim 1, wherein the particle size, $X_{99}$, of the machinability improving additive is below 30 μm.

7. The iron-based powder composition according to claim 1, wherein the average particle size, $X_{50}$, of the machinability improving additive is below 10 μm.

8. The iron-based powder composition according to claim 1, wherein the average particle size, $X_{50}$, of the machinability improving additive is below 5 μm.

9. An iron-based powder composition comprising, in addition to an iron-based powder, a machinability improving additive in powder form, said additive being muscovite, wherein the content of the muscovite is 0.05-0.3 wt %.

10. The iron-based powder composition according to claim 9, wherein the content of the machinability improving additive is 0.2 wt % or less.

11. The iron-based powder composition according to claim 9, wherein the particle size, $X_{99}$, of the machinability improving additive is below 50 μm.

12. The iron-based powder composition according to claim 9, wherein the particle size, $X_{99}$, of the machinability improving additive is below 30 μm.

13. The iron-based powder composition according to claim 9, wherein the average particle size, $X_{50}$, of the machinability improving additive is below 20 μm.

14. The iron-based powder composition according to claim 9, wherein the average particle size, $X_{50}$, of the machinability improving additive is below 10 μm.

15. The iron-based powder composition according to claim 9, wherein the average particle size, $X_{50}$, of the machinability improving additive is below 5 μm.

16. An iron-based powder composition according to claim 9, wherein the iron-based powder comprises less than 10% by weight of alloying elements.

17. The method for preparing an iron-based powder composition, comprising:
providing an iron-based powder; and
admixing the iron-based powder with a machinability improving additive in powder form, the machinability improving additive comprising muscovite, wherein the content of the muscovite is 0.05-0.3 wt %.

18. The method for producing an iron-based sintered part having improved machinability, comprising:
preparing an iron-based powder composition according to claim 9;
compacting the iron-based powder composition at a compaction pressure of 400-1200 MPa;
sintering the compacted part at a temperature of 1000-1300° C.; and
optionally heat treating the sintered part.

19. The method for producing an iron-based sintered part having improved machinability, comprising:
preparing an iron-based powder composition comprising, in addition to an iron-based powder, a minor amount of a machinability improving additive in powder form, said additive comprising a bentonite in powder form;
compacting the iron-based powder composition at a compaction pressure of 400-1200 MPa;
sintering the compacted part at a temperature of 1000-1300° C.; and
optionally heat treating the sintered part.

* * * * *